United States Patent [19]

Owen et al.

[11] 3,828,319

[45] Aug. 6, 1974

[54] COMPOSITION SYSTEM

[75] Inventors: David Gregory Owen; Alfred Henry Robinson; Norman Whalley, all of London, England

[73] Assignee: IPC Service Limited, London, England

[22] Filed: Aug. 28, 1972

[21] Appl. No.: 284,095

[30] Foreign Application Priority Data

June 23, 1970 Great Britain.................31645/69

Related U.S. Application Data

[63] Continuation-in-part of Ser. No. 43,695, June 5, 1970, abandoned.

[52] U.S. Cl. .............................................. 340/172.5

[51] Int. Cl. ............................ G06f 3/00, G06f 3/14

[58] Field of Search .................. 340/172.5, 324 AD; 178/7.3 D, 6.7

[56] References Cited

UNITED STATES PATENTS

| | | | |
|---|---|---|---|
| 3,020,525 | 2/1962 | Garrison et al. | 340/172.5 |
| 3,273,476 | 9/1966 | Haynes | 178/6.7 R |
| 3,305,841 | 2/1967 | Schwartz | 178/6.7 R |
| 3,323,119 | 5/1967 | Barcomb et al. | 340/172.5 |
| 3,388,391 | 6/1968 | Clark | 340/324 AD |
| 3,400,377 | 9/1968 | Lee | 340/324 AD |
| 3,500,338 | 3/1970 | Cuccio et al. | 340/172.5 |
| 3,521,241 | 7/1970 | Rumble | 340/172.5 |
| 3,593,305 | 7/1971 | Hadley | 340/172.5 |
| 3,629,844 | 12/1971 | Dancis | 340/172.5 |
| 3,641,558 | 2/1972 | Cook et al. | 340/172.5 |
| 3,675,232 | 7/1972 | Strout | 340/324 AD |
| 3,680,075 | 7/1972 | O'Donnell et al. | 178/6.7 R |
| 3,696,392 | 10/1972 | Fossum et al. | 340/324 AD |

*Primary Examiner*—Gareth D. Shaw
*Attorney, Agent, or Firm*—Brisebois & Kruger

[57] ABSTRACT

This invention relates to a system for the composition of typescript or other material from electronic signals generated in a computer. The signals are employed to operate a facsimile device to reproduce an image of the typescript or other material by means of linear scans. According to the invention, the output signals from the computer are fed through a converter which serves to convert the signals into a form suitable for reproduction of the typescript or other material by the facsimile device during its successive scanning lines as well as to compensate for the varying time duration of the different computer operations and the varying time duration of the data sensitive conversion process. The facsimile device may be a facsimile receiver adapted to support a photo sensitive carrier, such as a photographic film, on which the image is reproduced. Alternatively or additionally the facsimile device may be a cathode ray tube. Preferably the signals from the computer to the converter are in the form of run-length coding.

20 Claims, 16 Drawing Figures

Fig.13 Portion of a typical band, or scan line, across a page of text

Fig.14 Typical page layout

Portion of page divided into smaller rectangular areas in which lines of text, rules, pictures, etc. will be set.

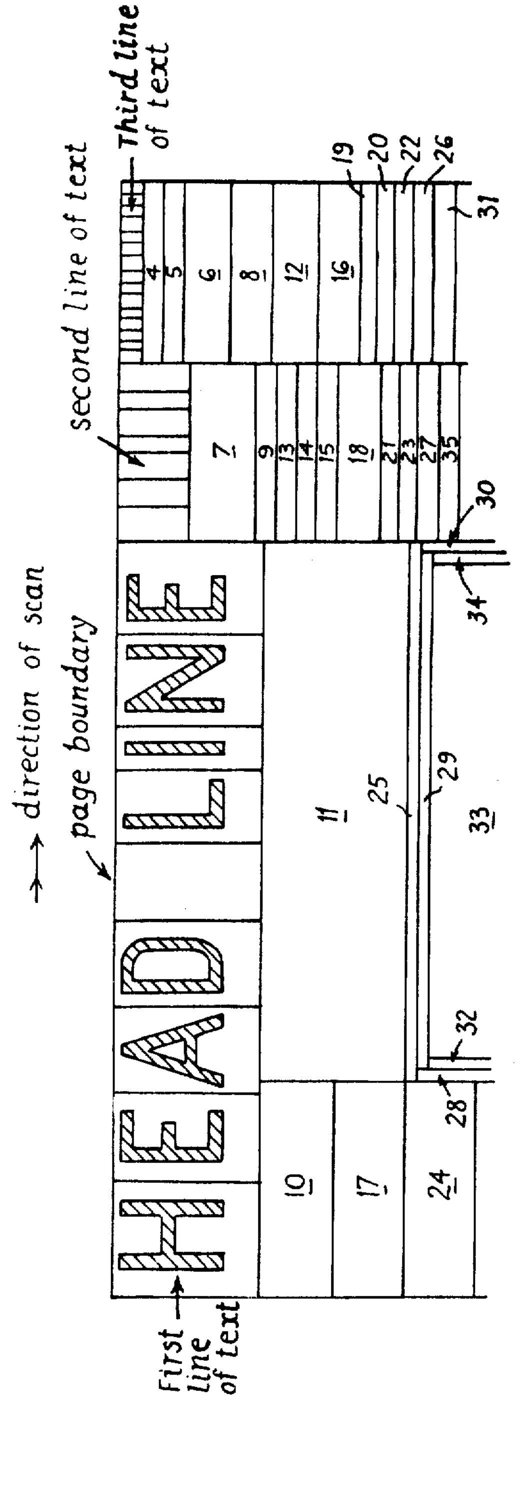
Fig.16 Example of sequence into which rectangles representing lines of text, rules, pictures, etc. are sorted and subsequently processed for output from the computer.

COMPOSITION SYSTEM

CROSS-REFERENCE TO RELATED APPLICATION

This is a continuation in part of application Ser. No. 43,695, filed June 5, 1970 and now abandoned.

FIELD OF THE INVENTION

The present invention relates to a system for the composition of typescript and also, if desired, graphic material by means of electronic signals generated in a computer.

DESCRIPTION OF THE PRIOR ART

In computer typesetting systems as at present employed, the task of setting type has hitherto been carried out in at least two distinct stages. In the first stage, the computer, controlled by a suitable programme of instructions, receives text and other relevant data which it processes into a form acceptable to a phototypesetting machine. In the second stage the phototypesetting machine sets lines of type according to the messages received from the computer. The connection between the computer and the phototypesetting machine may either be direct or indirect; in the latter case, a commonly used technique is for the computer to record its output in the form of punched paper tape or magnetic tape, which at some later time forms the input to the phototypesetting machine.

Such a phototypesetting machine typically contains a store of images of the letters of the alphabet, figures, and other characters in various type styles. It accesses them by mechanical, optical or electronic means, or by some combination of these means, so as to reproduce each selected type-image on a photographic medium which forms the output of the system. The computer which carries out the first stage of the process does not handle data descriptive of the shapes of individual characters, although it is usually supplied with the widths of the different characters so as to be able to break the text into groups of characters which will fit on successive lines when set by the phototypesetter.

A well known commercially available prior art computer which is useful in the system of the present invention is the Ferranti Argus 500 computer as described in the *Auerback Computer Technology Reports* 180.7310.150 "Ferranti Argus 500" pp 1–9, Auerbach Publishers Inc., 1972. The full facility 500 is preferred; other models 500E and 500L may be used but, as described in page 2 of the report, have limited stores and peripherals.

Well known commercially available computer buffer stores are useful with the system of the present invention.

Well known cathode ray tubes, herein referred to as CRT facsimile devices to indicate their well known display functions, are used as indicated in the present system.

Well known commercially available Muirhead Fascimile Receiver devices are useful in the present system, such as for example fascimile devices shown and described in British Pat. specification Nos. 766,004 (1957), 1,125,059 (1968), and 1,011,158 (1965).

SUMMARY OF THE INVENTION

According to the present invention, both stages of the process as described above can be carried out by means of a suitably-programmed computer to which are attached electronic circuits forming a converter device to assist in the production of high-speed electrical signals. The signals produced by this means are then recorded on a photographic medium by a facsimile device, such as a facsimile receiver of the type widely used for long-distance transmission of newspaper images, or on other forms of facsimile device which can reproduce an image by means of a succession of linear scans across a sensitive medium, such as a cathode ray tube.

With this arrangement, no phototypesetting machine of the usual kind is required, but a much greater quantity of data has to be processed within the computer, since its output is no longer merely a series of codes to which a phototypesetting machine will respond. The output from the computer, in order to be acceptable to a facsimile receiver or other linear scanning device, has to specify the required page-image as a sequence of very narrow bands or scan lines, extending from one side of the scanned area to the other, each band being contiguous to the previous band. The data generated for each band must define in detail the distribution of the black and the white portions of the band with such precision that when all the scans are complete on the film or other medium their combined visual effect will be the shapes of typographical characters and other elements of the desired page-image.

Although it might seem that these requirements involve the computer in sorting a vast quantity of data into a particular sequence, the methods adopted enable the output to be produced without entailing the use of a very large or powerful computer. Essentially, this is achieved by programming the computer to sort the separate lines of text, rules, pictures, etc., by reference to their positions on the page before generating any of the detailed data deriving from character shapes. The black-white portions of the first band across the page are then generated by the programme immediately in advance of the time when they are required for output to the facsimile receiver. Computing of the next band then proceeds whilst the first is being sent to the receiver, and so on until all the bands have been generated. In general, the data for only a very small number of completed bands are in existence at any one moment of time.

A further consequence of such an arrangement is that the computer can be programmed to produce not only letters of the alphabet, figures, symbols, and other conventional characters, but also lines, straight or curved and repetitive patterns of many kind which may be combined with the characters to form images of considerable variety.

The system of the present invention is thus one in which the connection of certain relatively inexpensive equipment to a computer of conventional design makes it practical to programme that computer to function as a phototypesetting machine, and furthermore to generate many kinds of image that are normally very difficult or impossible to produce except by purely manual methods.

A further very important feature of the system of the invention is that it faciliates automatic insertion of pictures amongst the text, and the overlaying of text and pictures.

The invention consists in a system for the composition of typescript or other material from electronic signals generated in a computer and including a facsimile device, operated by the output from the computer, and which reproduces the typescript or other material as an image by means of linear scans, wherein converter means are provided to convert the computer output signals into a form suitable for reproduction by the facsimile device of the typescript or other material, as well as to compensate for the varying time durations of the operations performed by the computer and for the varying time durations of the data sensitive conversion process.

According to a feature of the invention, the signals from the computer to the converter are in the form of run-length coding which enables the time taken for the issue of commands from the computer relating to the composition of each scan of typescript to be substantially reduced.

According to one embodiment of the invention the computer includes a buffer store having two separate storage areas, each area being sufficiently large to hold the run-length coding counts for one complete line scan at the facsimile receiver. The two areas of the buffer store are used in such a fashion that whilst the converter is extracting signals from one area to create one line scan, the computer is filling the other area with sufficient counts to cover the next line scan. When a line scan has been reproduced at the receiver, a signal originating from the receiver or the converter is sent to the computer to cause the computer to fill the area of the buffer store which has been emptied, while the converter extracts the signals applicable to the next line scan from the other area of the buffer store. It will be appreciated that more than two buffer storage areas may be provided to which signals are fed and extracted in sequence.

Two signal channels may be provided between the computer and the converter, each channel originating in the computer as either of two alternative areas of the buffer store. One of the channels representing the typescript information feeds a series of buffers or registers in the converter which are connected to form a "pushdown" store and which are kept filled with signals from the computer. The other channel also feeds a further series of buffers or registers in the converter in a manner controlled by the signals in the first channel and which registers contain signals respectively related to different segments of a line scan and also control words used for merging the output signals from the two channels.

Alternatively the computer buffer store may be operated in a cyclic mode. In such an arrangement, the run-length coding counts for each line scan terminate in a uniquely identifiable word and the computer logic is such as to prevent overlapping of successive line scans. Several line scans may be in the store at any one time and as one line scan is being fed out, another line scan may be built up by the computer.

In a further arrangement, control words may be interspersed with words containing run-length counts employed for the composition of the text.

Means may also be provided for feeding electronic signals representing graphic material from a suitable signal source, such as a facsimile transmitter, either to the converter or direct to the facsimile device. The control words may be employed for the production or insertion of pattern or graphic material into the output signals representing text.

The facsimile device may be a facsimile receiver which is adapted to support a photosensitive carrier, such as a film, and to be scanned in a linear fashion by a light spot modulated with the information signals to be recorded. Alternatively, the facsimile device may be a cathode ray tube whose scanning beam is deflected to form a series of scanning lines and is modulated with the information signals.

It is accordingly a primary object of the invention to provide an improved system for the composition of textual and other material, e.g., graphic material, by means of a computer.

It is a further object to provide a computer composition and typesetting system which does not require the use of conventional phototypesetting machines and in which the computer output under the control of a converter device can be applied directly to operate a facsimile device, thereby producing a photographic film image from which a printing plate can be produced.

Another object of the invention is to provide a computer composition and typesetting system in which the data is reproduced as a series of linear scans derived from run-length coded signals.

Other objects, features and advantages of the present invention will hereinafter appear from the following description given by way of example with reference to the accompanying drawings.

DESCRIPTION OF THE PREFERRED EMBODIMENTS

The systems to be specifically described are intended for the production of an image of typescript and graphic material on a carrier, such as a photographic film, from which a printing plate can be produced to enable the reproduction of printed matter on paper, e.g., one or more pages of a newspaper, magazine or book. The image of the typescript and graphic material may also be reproduced on a cathode ray tube.

The general techniques of digital computer construction and operation are well known in the art and except as in so far as the organisation and operation of the present invention is hereinafter described, reference may be made to the "Computer Handbook" by H. D. Huskey and G. A. Korn, published by McGraw-Hill Book Company in 1962 for basic computer circuits and their mode of operation.

Figure 1:
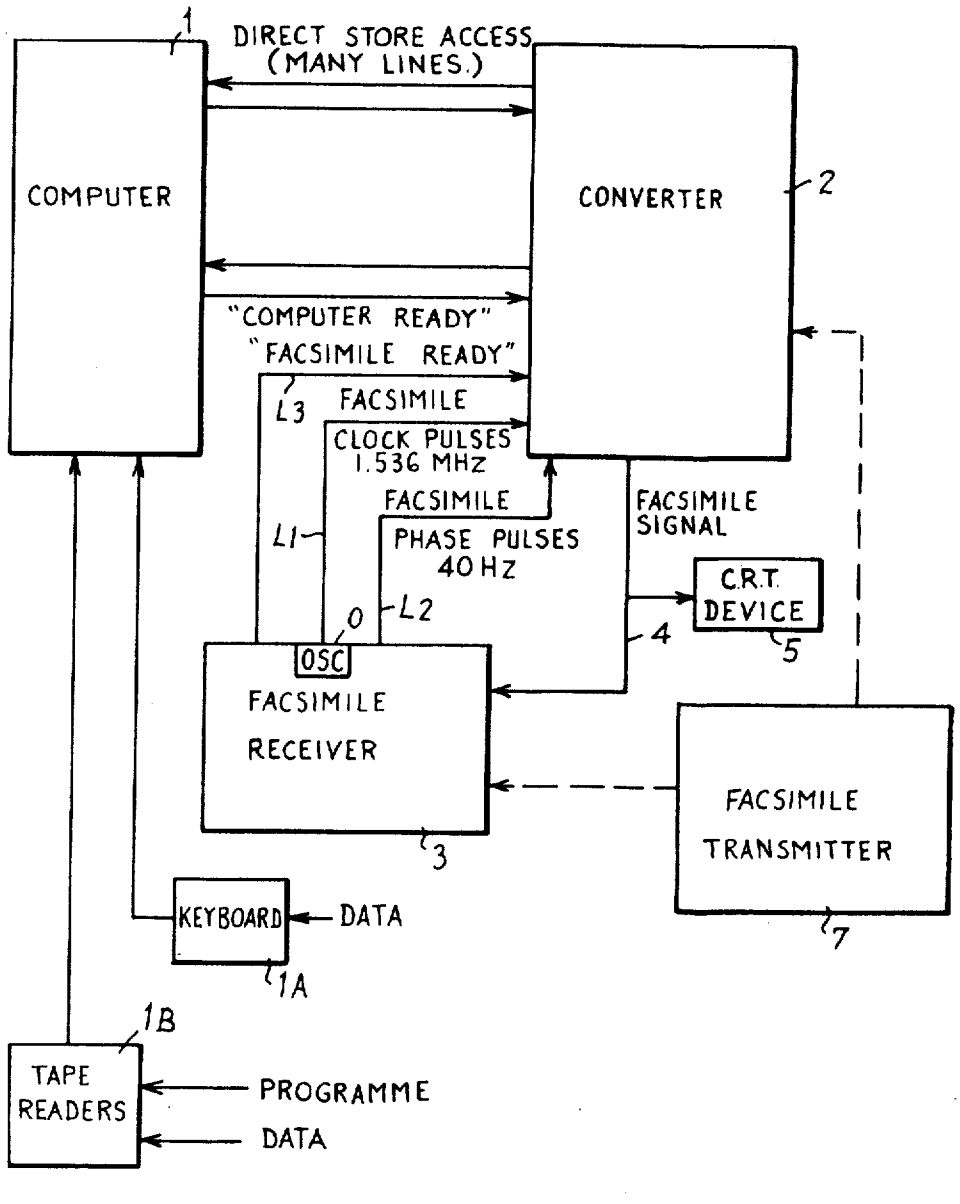
FIG. 1 is a simple block diagram of one embodiment of the system according to this invention.

As shown in FIG. 1, the system basically comprises a computer 1, whose output feeds a converter 2, which in turn feeds a facsimile receiver 3 over a signal channel 4. The receiver 3 comprises a rotating drum carrying a photographic film and scanned in a linear fashion by a light spot modulated with the information signals to be recorded on the film. The signals from channel 4 may alternatively or additionally be fed to a cathode ray tube facsimile device 5 having a storage type screen on which an image formed from a plurality of scanning lines modulated with the information signals can be reproduced and remain visible for viewing for an appreciable time period, e.g., several minutes or hours. It will be understood that the facsimile receiver 3 can be located remote from the computer 1 and converter 2, and the signal channel 4 can be a line connection or radio link of a suitable bandwidth for the signals to be passed from the converter to the facsimile receiver. Where graphic material is to be included, the system also includes a rotating drum facsimile transmitter or other scanning device 7 for transmitting information signals representative of the graphic material and whose output may be fed into either the converter 2 or direct to the facsimile receiver 3.

The transmitter 7 operates in synchronism with the drum of the facsimile receiver 3 to allow for the combination of such graphic material with the text image. The use of such a device avoids the necessity to store the graphic information in the computer.

Signals from pictures assembled in their correct positions upon the drum of the facsimile transmitter 7 may be gated into the input of converter 2 at appropriate times. Such pictures can be optically prescreened, or alternatively, electronically screened during the transmission process in order to produce the required halftone characteristics.

Provided that the relative positions of the two images (i.e. the typescript from the computer 1 and the graphic material from the facsimile transmitter 7) are correct, the reproduced image will have the typescript and graphics each occupying their proper position.

Further the two signals can be super-imposed, if desired, as will be described later.

The resultant composite signal, moreover, can be transmitted over the channel 4 and reproduced upon the facsimile receiver 3 at a distant point, since it is in effect, a two-level signal indistinguishable from a normal facsimile signal.

The computer 1 is fed with input data obtained from the keyboard 1A and with programme and other data from a recording medium such as punched paper tape or magnetic tape via tape readers 1B. Alternatively data may be obtained from another computer which accepts and processes text and other information, and interprets any corrections and instructions regarding the make-up of the page to be reproduced. The computer 1 is provided with a store for the characters to be printed, and also determines character spacing, vertical and horizontal justification, as well as effecting other processes associated with the assembly of the printed text into the desired columns or areas. The system to be described has been successfully operated employing a Ferranti Argus 500 computer for the computer 1 and a Muirhead "Pagefax" receiver for the facsimile receiver 3. The drum of the facsimile receiver 3 rotates at a speed of 2,400 r.p.m.

A vertical line-scan density of 400 lines per inch was chosen for this system, with a horizontal definition of 1,600 elements per inch. At these definition standards, on a page having a printing area 22 inches wide and 15 inches deep, for example, there are 6,000 line scans each of 36 thousand units, making a total number of units in the order of two hundred million per page. The use of a horizontal standard of 1,600 units per inch was dictated by the desire to provide a good standard of reproduction of sloping and curved lines forming typographic characters.

The method of computer output chosen for the bulk of the material — e.g., typescript — is run-length coding. This representation of the information content of a line-scan takes the form of a sequence of numerical counts expressing the lengths of successive portions of black (or another colour) and white image.

Although the scanning velocity of the facsimile receiver is constant, i.e., each line scan takes precisely the same time, the time taken for the issue of commands by the computer concerning the composition of each scan is radically reduced by the use of run-length coding, which materially eases the load on the computer. For example, in the case of the reproduction of a completely white line across the page, the computer has merely to utter a few large white counts and the converter 2 occupies the whole duration of the line to count down these numbers. During the balance of this time, the computer is free to perform other operations. The function of the converter is thus to transform run-length-coding commands from the computer into lengths of black and white actually to be reproduced at the receiver.

In view of the fact that some operations inside the computer take longer than others and also because the output signals are required from the computer at irregular intervals, it is inconvenient to synchronise closely the computer programme with the rotation of the facsimile receiver drum, and for this reason, the converter 2, is provided between the computer 1 and receiver 3. In other words, the converter 2 enables the computer to compose successive scan lines of a computer generated typescript, such as a newspaper page or other text, and output them to the facsimile receiver 3, with an acceptably small amount of output data. The storage and computing time requirements for handling this output data are also kept within acceptable limits.

Figure 2:
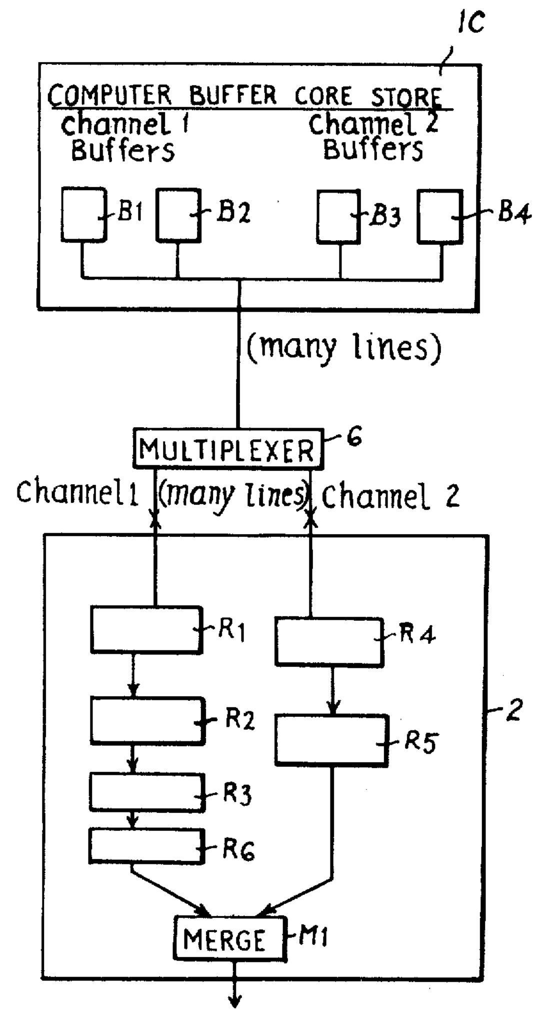
FIG. 2 is a block diagram showing the output buffers of the computer and of the stages of the converter.

Referring now to FIG. 2, the computer buffer store is shown at 1C and operates in conjunction with the converter 2 to smooth out the time divergencies between the computer operations and conversion process and the fixed time of scanning one line in the reproduced image. The computer buffer may be operated in a number of ways, the most efficient of which is a cyclic system. However, in this embodiment a simpler system is described, using four separate storage areas, B1, B2, B3 and B4. The areas B1 and B2 are each sufficiently large to hold the run-length-coding counts for one complete scan across the page. The two areas of the buffer are used such that while the converter 2 is extracting counts from one area and so creating one line scan, the computer 1 is filling the other area by entering into it sufficient counts to cover the next line scan. At the completion of the recording of each scan, a signal, originated by the drum of the receiver 3, is sent via the converter 2 to the computer 1. This causes the computer to start filling the area, B1 or B2, of the buffer just emptied, while the converter is extracting the information from the other area B2 or B1 of the buffer. The buffer areas B3 and B4 are operated in a similar manner to the buffer areas B1 and B2, i.e., during a period when B3 can be emptied B4 is being filled and vice versa. The function of the buffer areas B3 and B4 will be further described later on.

Figure 3:
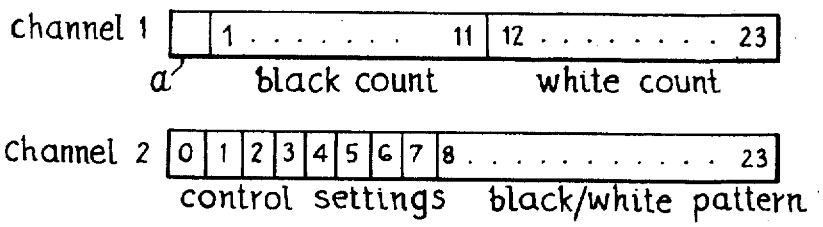
FIG. 3 is an example of the word format in channel 1 and channel 2.

There are two channels from the main computer to the converter via a multiplexer 6, as shown in FIG. 2. Channel 1 conveys run-length counts. The buffers B1 and B2 from which channel 1 takes its information contain a series of 24-bit computer words, each of which contains two numbers. That is to say that one word of 24 bits is divided into two parts, the first half being a black count and the second half a white count. This is shown in FIG. 3. In actual fact there is a third portion, in that the first of the bits in the word (marked *a* in the channel 1 diagram) is borrowed for a purpose which will be described later.

All the words that the computer stores in these buffers are of this format — the first bit has a special purpose, the next 11 bits are a binary number stating how much black is required, while the remaining 12 bits are another binary number stating how much white is required.

These can be any numbers up to 2,047 (11 binary digits) for the black count and 4,095 (12 binary digits) for the white count. The function of the converter, therefore, is to take words successively out of these buffers and to interpret first the black half and then the white half, then to take the next word and interpret it in like manner, sending out appropriate lengths of black and white signal to the facsimile receiver 3. It will be obvious that the length of time to which one of the words corresponds depends upon the magnitude of the numbers. Consequently it has been arranged that another word is not extracted from the computer buffer B1 or B2 until a previous word has been completely interpreted by the converter, which may, of course, be either a relatively long or a relatively short time. It is in this sense that the timing of the data conversion process is said to be data sensitive.

In considering the operation of the converter, it is convenient to take the worst situation, where several words in succession all contain small numbers, and for this reason the converter itself is equipped with three series-connected buffers or registers R1, R2 and R3 forming a so-called "push-down" store, each of one word-length, viz. 24 bits. The words pass successively through these buffers or registers and the converter logic ensures that they are kept as full as possible. When it is initially loaded, a word comes into the first register R1, is immediately pushed down into the second register R2 and a demand is sent back to the computer for another word. Meanwhile the word stored in the second register R2 is pushed down into the third register R3 and the word in the first register R1, when received, is pushed down into the second register R2. Thereafter a demand for a further word is sent back to the computer and so on.

The content of each word is de-coded and counted down in a fourth register R6 which comprises two counters — a black counter and a white counter — and as the number is counted down, so the signal transmitted to the receiver via the merge unit M1 is maintained black, until the number reaches zero, when the signal is switched to white and the count-down of the other half of the word begins.

It is necessary that the converter is provided with logic to deal with the situation where one of these counts is zero. Under these circumstances there will obviously be a count-down omitted and steps must be taken to provide time to get over to the next word.

Clearly, also, the converter must provide accurate starting points for each scan, so as to synchronise the signals with the rotation of the facsimile receiver drum as will hereinafter be described.

The converter 2 must also specify to the computer 1 the address in the store from which it requires the next word. To this end, the nature of the complete computer interface is such that it includes the multiplexer 6 having a large number of parallel lines, of which 24 are for information, another 16 are address lines and so on, and the converter must possess the requisite logic to apply the correct signal to all these lines, so as to actually extract the required information from the computer buffers.

Referring now to channel 2, in this embodiment channel 2 is provided with only two registers, R4 and R5, which are loaded from the other pair of buffer stores B3, B4 in the computer. The output from channel 2, like channel 1, is also a 24-bit word, but in the case of channel 2 it has a different format — see FIG. 3. The outputs of channel 1 and channel 2 are merged in the merge unit M1, as will be described in detail later.

The significance of the first bit *a* in channel 1 words can now be explained. Its function is to instruct the converter 2 as to whether it is, or is not, to demand words through channel 2. The convention is that if bit *a* is a 1, this signifies that channel 2 is to be "on." If, on the other hand, bit *a* is a 0, then channel 2 shall be "off." If therefore the computer sets a complete scan and all the first digits of the channel 1 words are 0, channel 2 remains inoperative throughout the whole scan. If, however, at any point across the page, the computer programme puts 1 in the *a* position of a channel 1 word, channel 2 immediately becomes operative. The precise function of channel 2 is explained as follows:

First, channel 2 clock pulses generated in the converter 2 advance the channel 2 buffer address steadily, all the way along the scan on the basis of one buffer word per 32 horizontal units along the scan. As there are 36,000 horizontal units per scan, this corresponds to something over 1,000 buffer words, the first word corresponding to the first fiftieth of an inch from the left hand side of the page, the next word corresponding to the next fiftieth of an inch and so on. The thousand-plus word corresponds to the last fiftieth of an inch on the extreme right-hand side of the page. In metric measurement one-fiftieth of an inch corresponds approximately to 0.5 millimetre.

In consequence, unlike the buffers associated with channel 1, the buffers of channel 2 can be regarded as a pictorial representation of the scan and, whereas channel 1 may define the whole of a scan in a very few words or alternatively in very many words, dependent upon the subject matter of the page, there is no proportionality between the number of words issued by channel 1 and the width of the page.

In the case of channel 2, on the other hand, the number of words is fixed and there is a precise 1/1 correspondence between each word from either one of the buffers and a specific position on any scan line.

As a result, the converter 2 is regularly addressing successive words in channel 2, as the traverse of the scan progresses. In consequence, if, at any moment, a request comes through the agency of bit *a* in a channel 1 word, that channel 2 should be switched on, the converter, in obeying that instruction, immediately collects that portion of the information in the channel 2 buffer that refers to that point in the scan which has been reached at that particular moment.

As regards the format of the channel 2 words, a division different from that of the channel 1 word is adopted, in that the last 16 bits of the channel 2 word give an explicit black/white pattern (see FIG. 3) on the basis of one bit to each 2 units of scan. That is to say that the units in channel 2 are twice as wide as those in channel 1. This implies that, if any particular one of the 16 last bits in the channel 2 word is a 1, the facsimile receiver will print out two units of black. If conversely, it is a 0, the facsimile receiver will print out 2 units of white, the sequence being continued until the end of the word is reached. The 16 bits contained in the last part of a channel 2 word occupy exactly a width of 0.02 inch across the page. The next word will fill up the next 0.02 inch and so on, as long as channel 2 is switched on.

It will be apparent, therefore, that if channel 2 is operative, it will demand a succession of words at fixed intervals of time which would represent a very heavy load on the computer. It is for this reason that the facility for switch channel 2 on and off by the first bit of each channel 1 word has been adopted, in order to reduce the load on the computer. The first 8 bits of a channel 2 word each have certain special functions, as will be described later in connection with the merging of channel 1 and channel 2.

In order to achieve the required synchronisation of the system clock pulses are obtained from a 1.536 MHz oscillator 0 (see FIG. 1), which is located at the facsimile receiver 3 and which is locked to the facsimile oscillators, i.e., to the rotation of the drum. The 1.536 MHz clock pulses are fed to the converter 2 over a cable L1. A second cable L2 carries a train of 40 Hz phase pulses derived from a digital divider system which is locked to the 1.536 MHz oscillator and to the facsimile receiver 40 Hz phase pulse system.

When the cumputer 1 is ready to start outputting data, a "computer ready" signal is sent from the computer to the converter. This signal occurs once the computer has been loaded with programme and data tapes and has progressed programming to the point at which the first scan line of output data has been prepared and deposited in the computer core store in an area which will eventually be accessed directly by the converter 2.

Similarly, when the facsimile receiver 3 has been run up to operating speed and phased in with the facsimile transmitter 5, it is ready to accept data from the converter. Provided that the "computer ready" signal has been received by the converter, the facsimile receiver 3 and, if provided, the facsimile transmitter 7 for generating graphic material, can be switched to "traverse" and the conversion process can commence.

The act of switching the facsimile receiver 3 to "traverse" causes a "facsimile ready" signal to be sent on a coaxial link L3 from the facsimile machine to the converter.

The various parts of the system will now be further described with reference to FIGS. 4 to 8.

Figure 4:
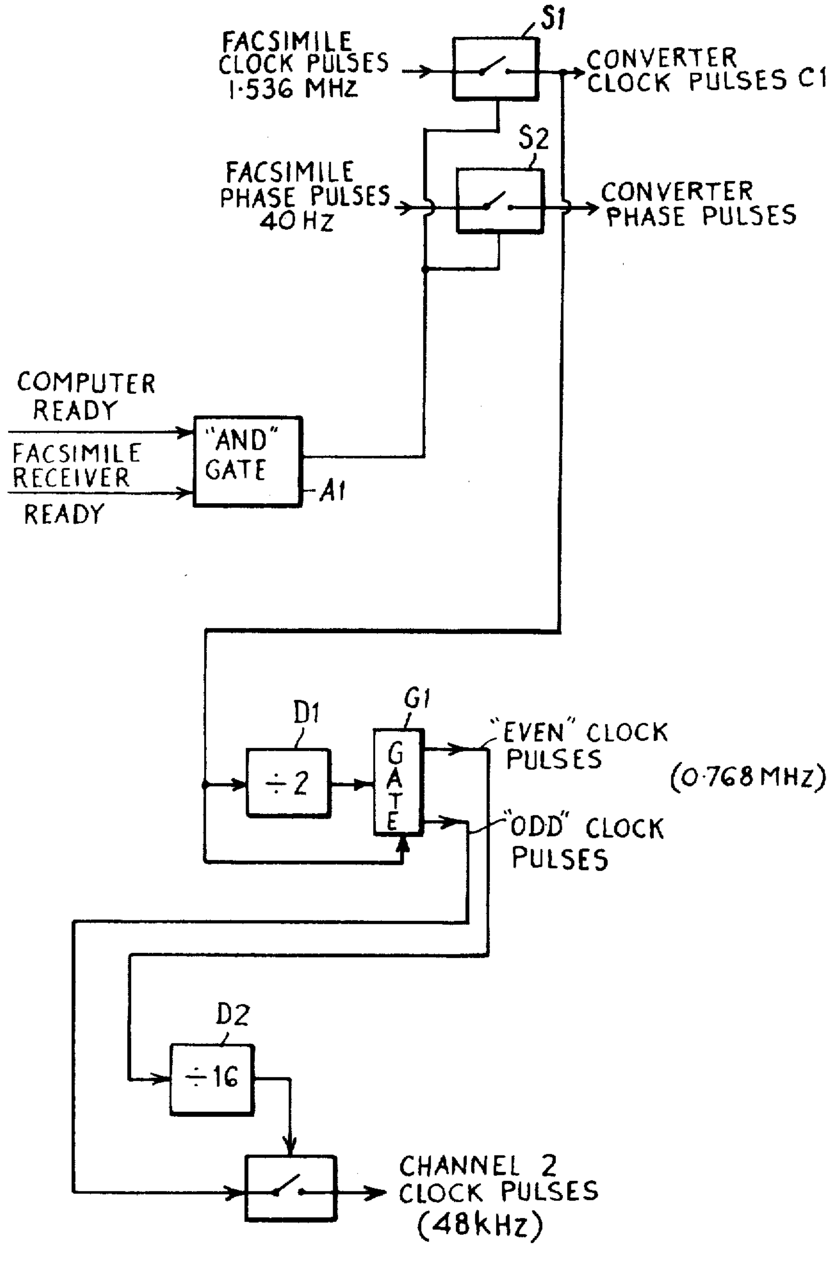
FIGS. 4 to 8 are more detailed diagrams of parts of the system shown in FIGS. 1 and 2

As shown in FIG. 4, the converter starts operating on receipt of both the "facsimile ready" and "computer ready" signals by an AND gate A1, whose output switches "on" the converter clock pulses C1 and phase pulses by means of switch circuits S1 and S2. These pulses are derived respectively from the facsimile clock and facsimile phase pulses.

The 1.536 MHz converter clock pulses provide the basic timing for the converter; each clock pulse corresponds to one picture element along the scan lines. However, the converter has two basic modes of operation, i.e. channel 1 only or channel 1 plus channel 2, and slower clock pulses are required for channel 2 operation which run at one pulse per 32 of the basic clock pulses, i.e. 48 KHz. The latter frequency is obtained by means of a divide-by-two circuit D1, gate G2 and a divide-by-16 stage circuit D2.

As is well understood in the art, all communication between the computer and the converter is carried out on the "Direct Store Access" (DSA) lines. This facility allows the converter to extract information from defined areas of the computer core store under its own control, i.e., the data transfers are not computer controlled. Data words are transferred to or from the computer on 24 parallel data lines and the core store locations of these words are specified on 16 parallel core store address (C.S.A.) lines. Other D.S.A. lines allow data and address gating, and other control functions necessary for data transfer operations, as well as for communication between the computer and one or more external devices. In this system the two converter channels are multiplexed in a conventional manner, as is represented by the block 6 in FIG. 2.

As channel 2 is the simplest of the two converter channels, and because its address counter is used for other timing purposes, it will be described first.

Figure 5:
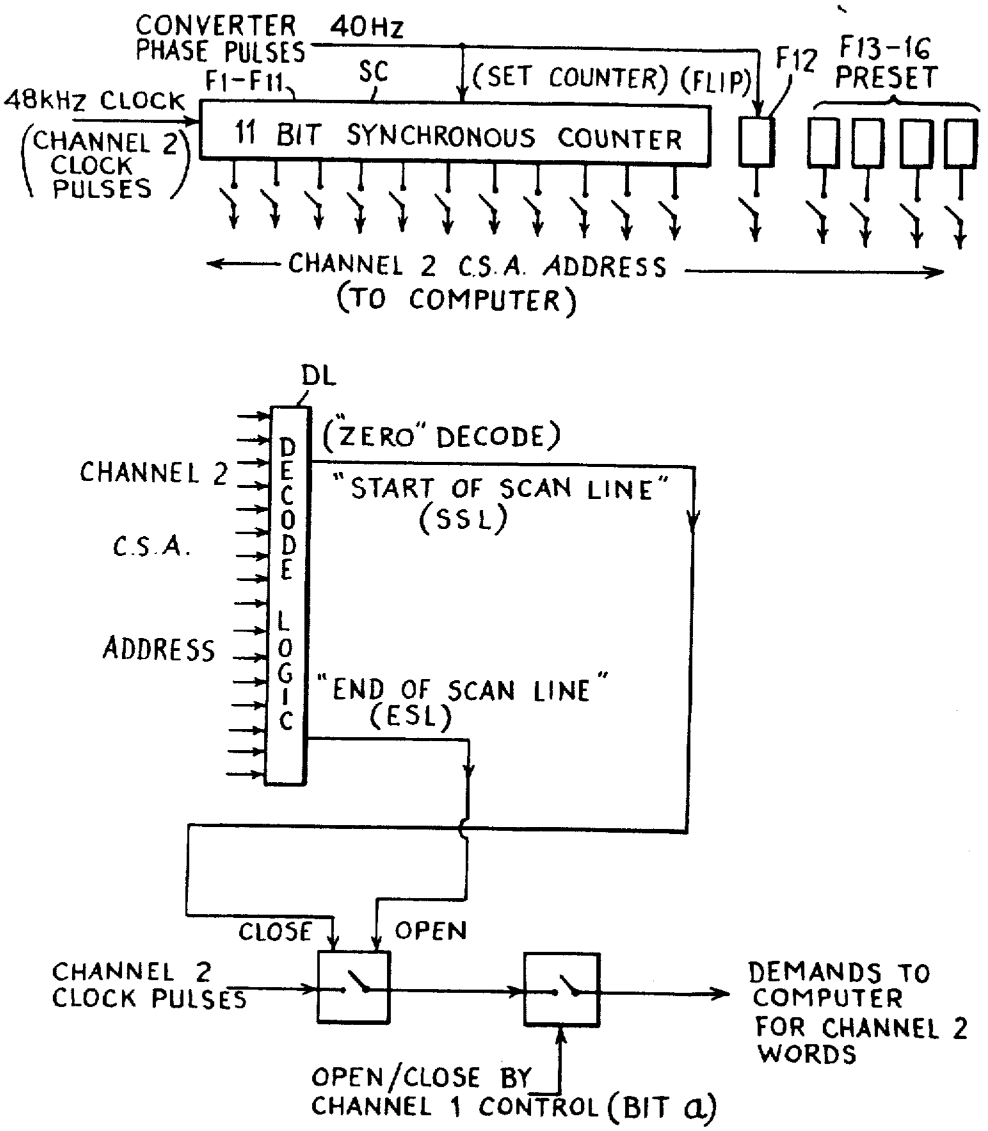
Figure 6:
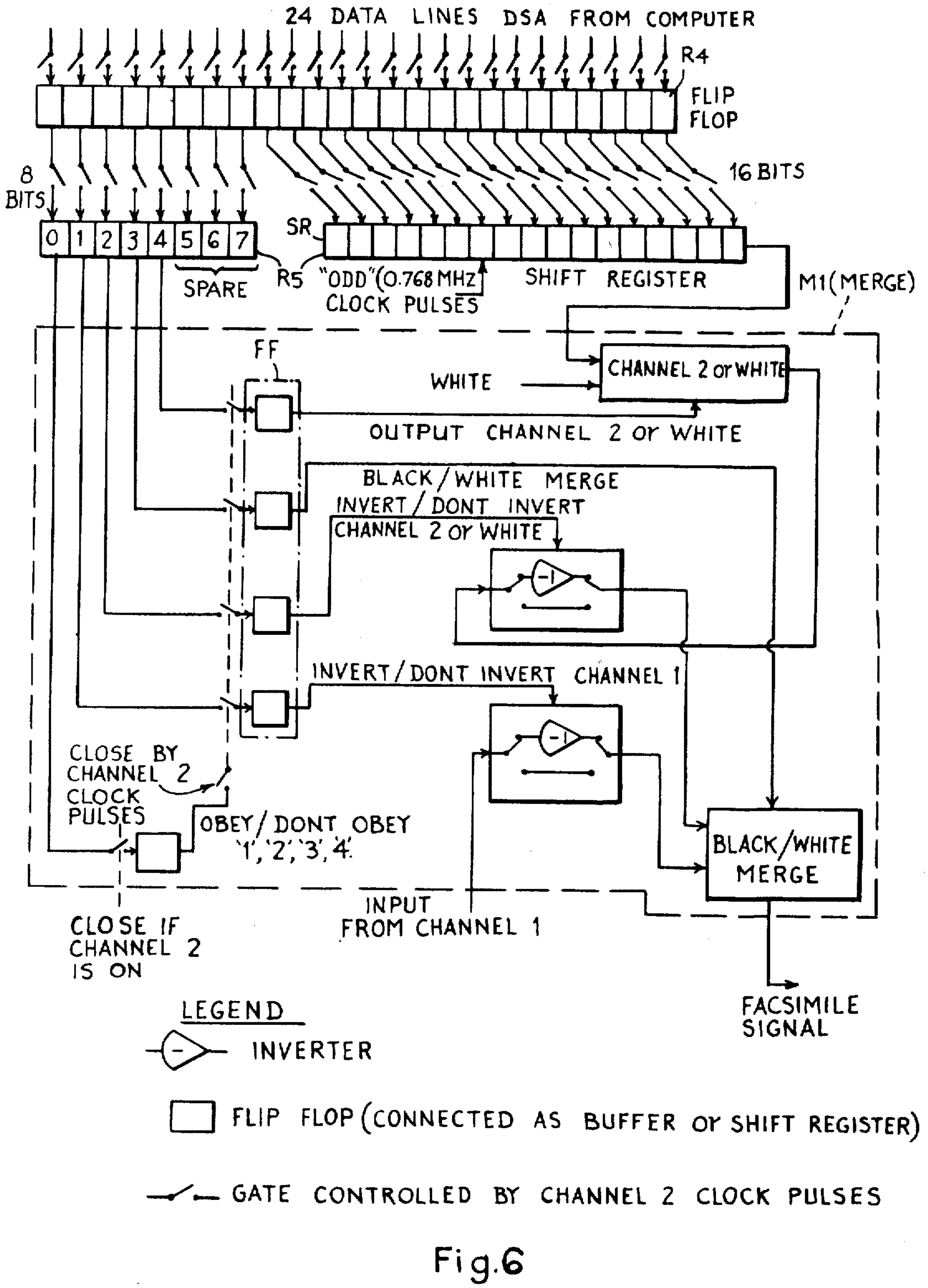

Channel 2 — FIGS. 5 and 6

Referring to FIG. 5, channel 2 clock pulses at 48 KHz drive an 11 bit synchronous counter SC1 comprising flip-flops F1 to F11. The counter is reset to a small negative number by converter phase pulses at 40 Hz and then counts up steadily (at the rate of 48 KHz), so that the count is advanced one per one-fiftieth inch of scan, the speed of the 24 inch circumference facsimile drum being 2,400 rpm. Decode logic DL is connected to the counter SC and two decodes are taken, one to denote the start of the active scan line (SSL), the other to denote the end of the active scan line (ESL). As previously explained, the active scan line is 22 inches and this allows a one inch margin on the 24 inch facsimile drum corresponding to the fixing strip used to attach the facsimile film: it also allows a small period to elapse between the end of one printed scan line and the start of the next.

During the active scan line period, demands are sent to the computer for channel 2 words. When channel 2 is operative, there is one demand per channel 2 clock pulse. When channel 2 is inoperative, the demands for channel 2 words are inhibited, but the 11 bit synchronous counter SC1 continues to run. When channel 2 is operative, the core store address accessed for each channel 2 word is given by the number contained in this counter, for the 11 least significant bits, and by preset flip-flops F13-F16 for the four most significant bits. The remaining bit is obtained from a flip-flop F12 which alternates its state once per scan line. The 11 least significant bits thus determine a block of store and the five most significant bits locate the starting point of the block (the initial address). The alternating bit causes channel 2 to read data from the alternating blocks of the computer core store (B3 and B4 in FIG. 2) — one block being accessed whilst the other is being prepared and loaded.

Channel 2 is switched on and off by the status of the most significant bit of channel 1, (i.e. bit *a* of FIG. 3).

Each incoming channel 2 word is loaded into the 24 bit buffer R4 (FIG. 2), comprising 24 flip-flops — as indicated in FIG. 6.

As previously described with reference to FIG. 3, the eight most significant bits are used for control purposes (merging operations), whilst the 16 remaining bits correspond to 16 black/white elements along a scan line. Each of these channel 2 elements occupies two basic picture elements along a scan line. (i.e., channel 2 operates at half the horizontal resolution of channel 1).

Once per channel 2 clock pulse, the 16 black/white elements are transferred to a 16 bit shift register SR forming part of the register R5 and are then output in serial form in one channel 2 clock pulse period to produce a channel 2 black/white element pattern for merging with a channel 1 black/white pattern in the merge unit M1.

The input of data into the channel 2 buffer, and its subsequent transfer to the shift register are indicated schematically in FIG. 6.

Whilst the 16 shift register bits are being derived from the shift register, the associated control bits are stored in flip-flops FF as indicated in FIG. 6. These control bits correspond to the channel 2 control word format illustrated in FIG. 3.

Figure 7:
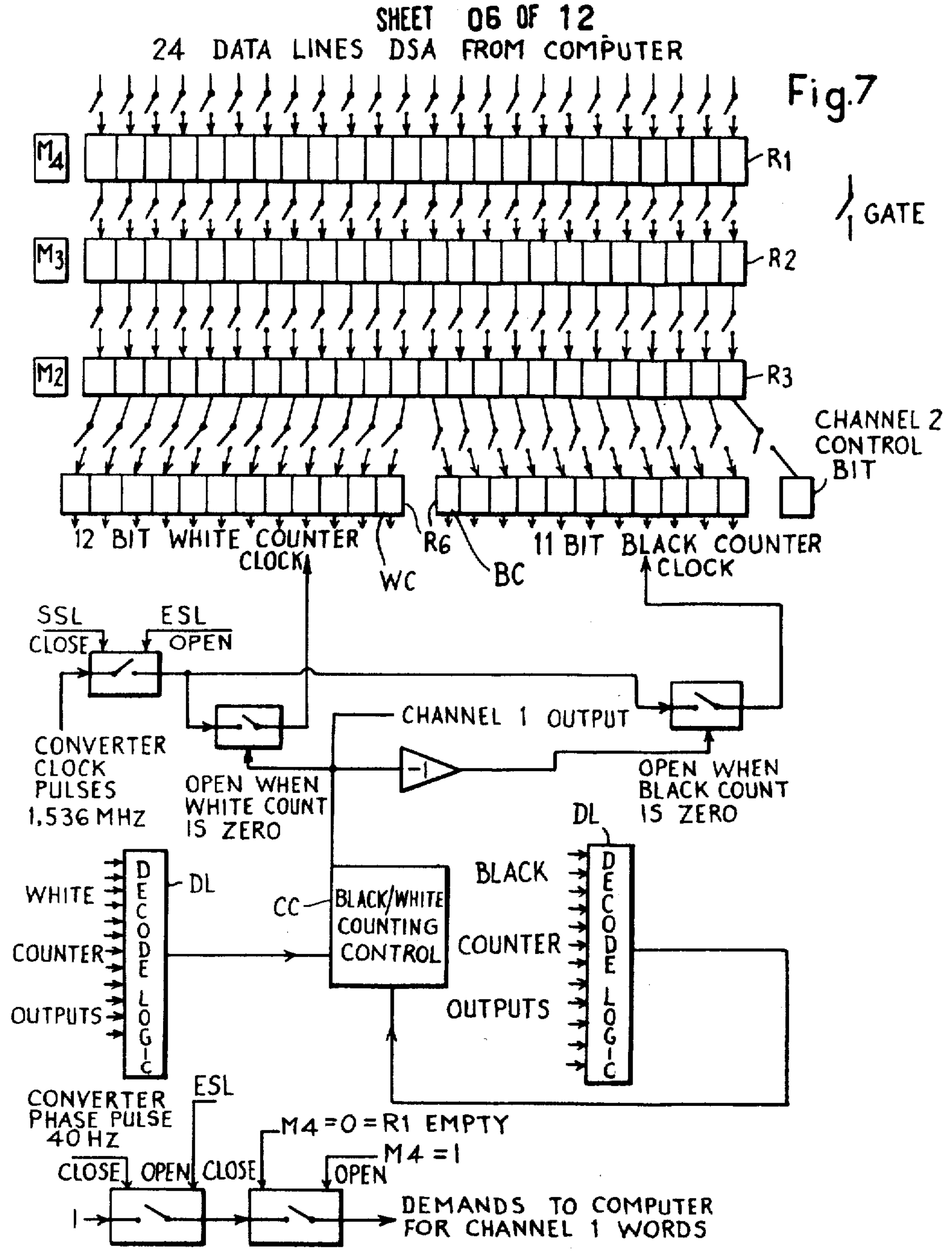
Figure 8:
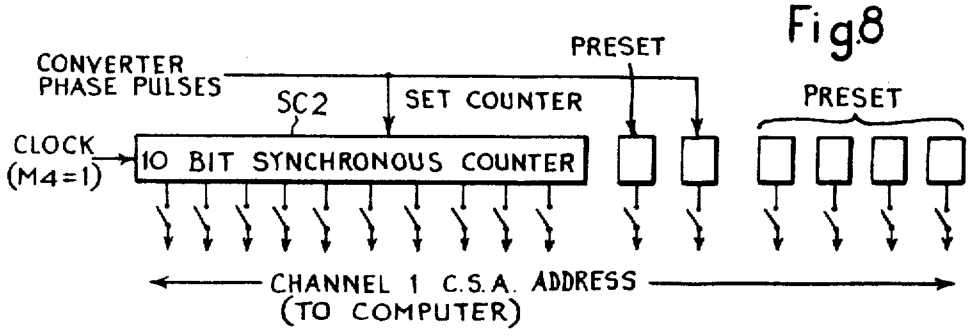

Channel 1 — FIGS. 7 and 8

The black/white bit patterns produced by channel 1 are stored in coded form to minimise the data transfer rate from the computer when dealing with textual matter. (Channel 2 is most useful for non-textual material, i.e., graphics). The coding consists of recording the lengths of sequences of black picture elements, and of white picture elements, in binary form. Thus, for example, any white run-length sequence of 0 to 4,095 picture elements can be coded by a 12 bit binary number. Similarly any run-length sequence of black picture elements of 0 to 2,047 can be coded by an 11 bit number. The remaining 24th bit of a channel 1 word is the control bit *a* used to control the ON/OFF condition of channel 2 as previously described.

Each channel 1 word is gated into the 24 bit buffer or register R1 as indicated in FIG. 7. Channel 1 words are transferred in sequence to the second 24 bit buffer or register R2, the third buffer or register R3, and finally to 24 bits of storage connected to form two counters R6. These buffers form a push-down store. In the counters R6, the least significant 12 bits of a channel 1 word are counted down in a 12 bit "white" counter WC and then the next 11 bits are counted down in an 11 bit black counter BC. Once the two counters are empty, then the next channel 1 word is pushed down from the buffer immediately "above" the counters, i.e., the third buffer R3. Once the word transfer has taken place, the third buffer is reset and thus prepared to accept another channel 1 word from the second buffer R2 immediately it becomes available. A word transfer between these two buffers is immediately followed by the reset of the second buffer. Similarly word transfers take place between the first and second buffers R1 and R2. Whenever the first buffer R1 is reset — i.e., immediately after a push-down into the second buffer, it is ready to accept another word from the computer and so a channel 1 demand is immediately sent to the computer. Once a channel 1 demand has been obeyed, the demand signal is removed until such time as the first buffer executes another push-down.

Decode logic DL is used to determine the state of the black and white counters and thus to control the alternate black/white counting operation as indicated schematically in FIG. 7. The state of each buffer is also recorded in a single flip-flop: M4 for the first buffer, M3 for the second buffer and M2 for the third buffer.

The push-down operations are controlled by monostable circuits connected to these marker flip-flops M2, M3 and M4 so that the push-down operation is as fast as the flip-flops will allow. Thus a number of transfer and reset operations can occur within one clock pulse period.

The time taken to count down a channel 1 black/white word obviously depends upon the values of the black/white runs, and consequently the push-down operation is irregular.

The buffers R2, R3 and R4 serve as a queuing system to smooth out the irregular demands implied by run-length coding, and thus obviates unacceptable loading of the DSA lines connected to the computer.

The computer core store is addressed by a synchronous counter SC2 shown in FIG. 8. This counter however is driven by the first buffer marker flip-flop M4. Thus, the counter is advanced by one count at the end of each push-down from the first (i.e., input) buffer R1.

The two core store address counters, i.e., for channel 1 and channel 2, are multiplexed onto a 16 line common highway by suitable gating logic and signals. Similarly the data inputs for the two channels are multiplexed onto a 24 line data highway.

The black/white counters are only clocked during the active line period by means of the "start and end of active scan line" signals SSL and ESL obtained from the channel 2 counting system.

At the start of every line, the channel 1 buffers are all reset to zero by the 40 Hz converter phase pulses. The push-down logic automatically generates sufficient channel 1 demands to load the counters R6 with the first channel 1 word and the buffers R1, R2 and R3 with the next three channel 1 words. Once the "start of print line" decode signal is received, the counters are operated and the run-lengths are decoded at the correct rate to keep the channel 1 and channel 2 signals in step.

The channel 1 output signal is obtained simply by noting whether the black counter or the white counter is operating. When the black counter is being driven the channel 1 signal is black — otherwise it is white. This is determined by the black/white counting control circuit CC.

Channel 1 — Channel 2 Merging Process — FIG. 6.

The outputs of channel 1 and channel 2 can each, in principle, be used to produce complete scan lines. However, as mentioned previously, channel 1 is most useful for producing text, and channel 2 is better at producing half-tone (screened) pictures as well as computer generated patterns, such as electronic shading or hatching. The eight control bits of channel 2 words allow the two channels to be combined in a variety of ways as will now be explained.

Bit 0 is a general "on-off" instruction, which dictates whether the channel 2 system shall act in accordance with the bits that follow or not. Bit 1 instructs whether the output of channel 1 shall henceforth be inverted or not. Bit 2 performs a similar function for channel 2, i.e. when bit 2 indicates "on" it henceforth inverts the pattern generated by the 16 bits contained in the latter part of each channel 2 word. Bit 3 instructs whether, in merging the output of channels 1 & 2, black or white is to win. In other words if black is to win, the either channel commands black, the final output will be black. If the instruction is that white is to win, the converse applies and the final output is white. This facility permits of a number of combinations between channel 1 and channel 2 which together with the function of bit 4 will be described later. Bits 5 to 7 marked as "spare" can be allocated to special functions as required.

As has been described, bit 0 in the channel 2 word is an "on and off" bit, but applies only to the group of control bits and not to the 16 bit black and white pattern which succeeds them in the channel 2 word. The purpose of this is that, in a sequence of channel 2 words covering some particular area of the page, an occasional word will be marked in position 0 as being a word containing new settings of the other control parameters. In fact, as far as bit 0 is concerned, 0 = "on" and 1 = "off" so that all those words that have 1 in the bit 0 position are words in which the converter ignores the parameters allocated to bits 1,2 and 3 (e.g., "invert," "white wins" and so on). When, however, the bit 0 position is 0, this means "take these new values for the parameters and operate on that basis, from now until further instructions."

As distinct from the function of the first 8 bits in every channel 2 word, the final 16 bit black and white pattern is always printed out whenever channel 2 is switched on by bit *a* in the channel 1 word. The precise nature of the final image is, of course, modified by the change of parameters set in bits 1–3 of the same word if, and only if, bit 0 is a 0. This procedure avoids the necessity for the computer to have to write these control parameters into every word in the channel 2 buffer — it merely has to change them as and when necessary. Bit 4 gives an instruction either to output or suppress the 16 black/white bits which follow at the latter end of the channel 2 word so that even if channel 2 is "on," this instruction can inhibit the printing of the black/white pattern.

From the foregoing it follows that if all words in the channel 2 buffer are considered as representing segments of the scan across the page, it is possible to write into a particular word in channel 2 the specific mode in which channel 2 is to operate. This will apply up to some later point in the scan, when some other control word can be written in which could, for example, switch everything back to normal.

Although the primary function of channel 2 is to build up dot patterns forming the half-tone dots of a screened graphic, many novel effects may be produced by discrete use of the control bits in the first part of the channel 2 word. For example, apart from the simple case of inverting black annd white, there may also be produced black letters on a dotted background, dotted letters on a background, white letters on a dotted background, captions superimposed on pictures and even large characters in-filled with picture detail. These are only a few of the various effects which are possible. The system lends itself also to the introduction of "mechanical tints" and the reduction of the density of black characters to any shade of grey. All the foregoing effects can be produced without affecting the operation of channel 1.

As mentioned above, three of the control bits ('5,' '6' and '7') are not used in this embodiment but in principle other merging operations can be built in with them. In particular, logic has been designed to allow channel 2 bit patterns to be moved horizontally along the scan by a variable amount relative to channel 1.

The converter output signal is connected to the exposing lamp of the facsimile receiver via a coaxial cable.

The signal is at baseband, i.e., it by-passes the carrier demodulator in the receiver.

Computer Facsimile Transmitter Merging Process

Whilst receiving computer generated material from the converter, the facsimile receiver can also simultaneously accept material from the facsimile transmitter 7 to form another merge. This allows graphical material to be prepared independently and then merged with the computer generated output, without the need for it to be handled or processed by the computer. This merge can be performed by a single two input AND gate and may take place either in the converter, or in the facsimile receiver.

The transmissions from the converter and facsimile transmitter can be either at baseband or on carrier (or both).

Figure 9:
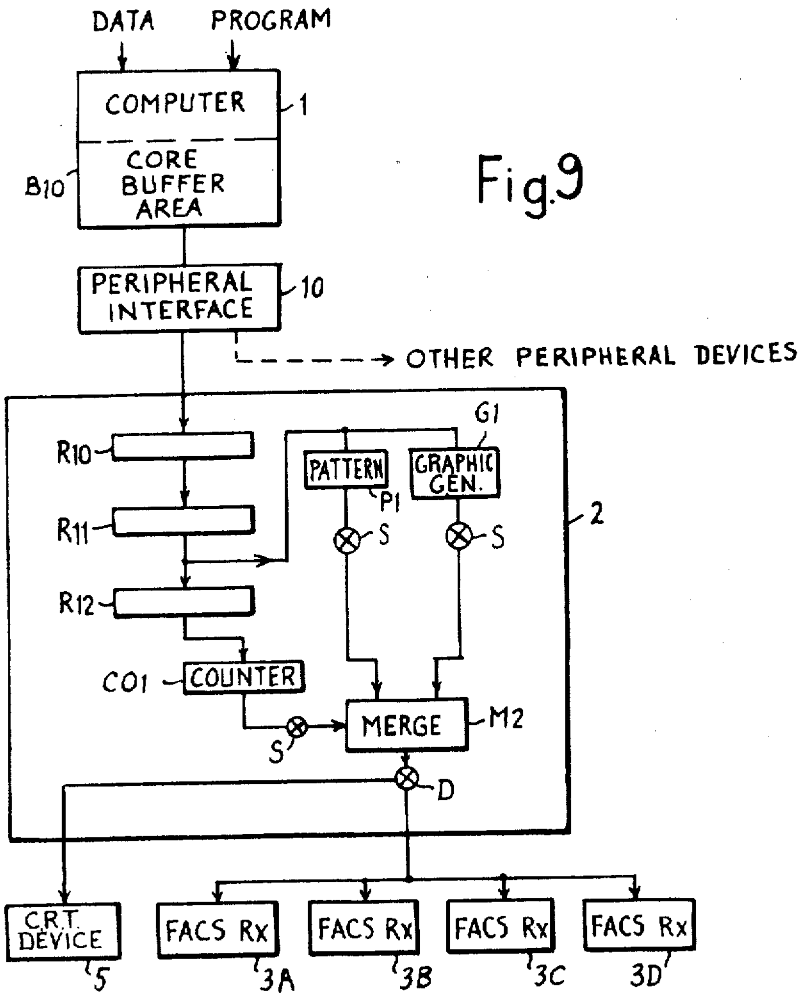
FIG. 9 is a block diagram of a further embodiment.

A further embodiment of the system according to the invention is shown in FIG. 9 and except insofar as is hereinafter described, the various parts of the system operate in a similar manner to the previous embodiment. The system again basically comprises a computer 1, a converter 2, one or more facsimile receivers 3, and a cathode ray facsimile device 5. The computer is provided with a core buffer area B10 operated in a cyclic mode as is well known in the art. The data to the computer may be obtained as in the previous embodiment. The computer output is fed via the peripheral interface 10 on the D.S.A. lines to the converter 2 whose output is in turn fed to the one or more facsimile receivers.

The converter comprises three storage areas or registers R10, R11, and R12, a pattern generator P1, a graphics generator G1, a counter CO1, one or more merging units M2, and a distributor or selector switch D. In a monochrome system only a single facsimile receiver is required. However, in a full colour system the distributor feeds four receivers 3A, 3B, 3C and 3D, respectively producing films simultaneously to give black, magenta, yellow and cyan separation images employed for producing the different printing plates to give full colour reproduction. The various switches S are channel selection switches which are only required for simultaneous four colour working. The switch D is a selector switch for selecting between the facsimile receivers 3 and the cathode ray display tube 5. It will be understood that the links shown between the main units of the system comprise, where necessary, many lines carrying control signals and data in one or both directions.

By means of selector switch D, the output signals from the system may be employed to drive the cathode ray display tube 5, e.g., for proof reading purposes.

As in the previous embodiment, the computer produces a series of 24-bit words which are assembled in the buffer area of the core ready for transmission to the converter and this transfer to the converter is done without requiring any programme intervention. Only one channel is used, as the data transmitted for the generation for patterns and graphic material is interleaved with the main text information and not transmitted down a separate channel as in the previous embodiment. Such an arrangement simplifies the converter and general control system.

Figure 10:
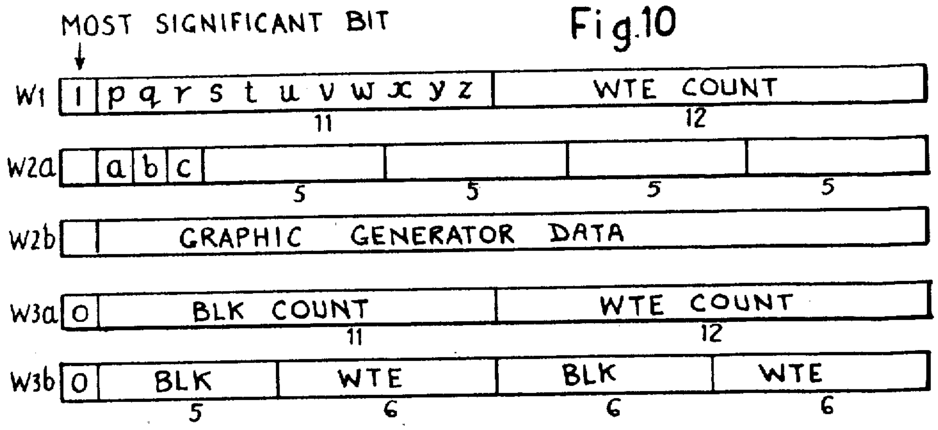
FIG. 10 is a diagram of the word format for the embodiment of FIG. 9.

The main data stream from the core buffer area B10 to the converter 2 consists of 24-bit computer words having any of the formats shown in FIG. 10. A word with format W1 is termed a control word and contains control instructions affecting the devices in the converter. In certain instances the word immediately following a control word may be a secondary control word with either format W2*a* or W2*b*. The secondary control word provides data required by the pattern generator P1 or the graphic generator G1.

Words of format W3*a* form the bulk of the data stream, and each contains a black and a white run count as in the previous embodiment. An alternative format W3*b* is provided in which four counts of smaller values can be accommodated. These data words are distinguished from control words by the value of the most significant bit, which is always 1 in a control word W1 and always 0 in a data word W3*a* or W3*b*.

All words are received by the converter over a 24-bit parallel highway and are gated first into the 24-bit register R10 and from thence into registers R11 and R12. The three registers form a push-down store operating in a similar manner to that described in the previous embodiment.

A control word is identified by the fact that the most significant bit is a 1, and the portion of this word that contains control instructions is used not as a black run count but to initiate control actions on completion of the white count for the preceding word. If a secondary control word is indicated as following a control word, this word is routed to the pattern generator or graphic generator as appropriate.

The instruction portion of a control word W1 occupies the 11 bit positions normally used to hold a black count, and the bits have meanings as follows:

- *p:* if $p = 1$, invert the output of counter CO1 henceforth
- *q,r:* selects one of four facsimile receivers to receive the output of counter CO1 via the distributor D, the other receivers receiving a modified version of this image according to the instructions that are supplied for merging.
- *s,t:* selects one of four methods of merging the outputs of the counter CO1 and the pattern generator P1 so as to form suitable images for the four facsimile receivers.
- *u,v:* selects one of four methods of merging the outputs of the counter CO1 and the graphic generator G1.
- *w:* indicates that the following word is a secondary control word and arranges for it to be routed to the pattern generator P1.
- *x:* indicates if $u = 1$ that the following word is a secondary control word and arranges for it to be routed to the graphic generator G1, or if $u = 0$ that the graphic generator is to cease operation
- *y:* not allocated
- *z:* indicates whether the data words which follow are in format W3*a* or W3*b* and adjusts the mode of operation of the counter CO1 accordingly.

The remaining 12 bits of a control word contain a white count of the normal kind, which follows the control action.

A secondary control word of format W2*a* contains four 5-bit run counts which may define a pattern that is to be generated. In this case bit *a* specifies whether the pattern is to be inverted, and bits *b*, *c* select one of the four output channels via the distributor D1. The word can alternatively define a colour tone (if the most significant bit of the word is a 1), and in this case supplies four values of colour intensity to the pattern generators.

A secondary control word of format W2*b* defines the required mode of operation of the graphic generator G1. When the latter takes the form of an electronic scanner is is arranged that more than one secondary control word can be accepted in order to specify in full the scan that is to be carried out.

The converter 2 also generates master clock pulses of 7.776 MHz. These clock pulses, or a derivative of them, are synchronised with the facsimile receivers using 40 Hz phase pulses produced by their rotating drums, and are used to control the timing of all the actions of the converter. These clock pulses are derived in a similar manner to those of the previous embodiment.

In this embodiment there are 23.3 usable inches around the circumference of the facsimile drum and there are 1,600 elements to the inch. Hence the total count of elements along one line scan across the film can reach 37,280. However, at any point along the scan the generation of the video signal is discontinued if an all-zero word indicating the end of a scan is encountered in the data stream, and the necessary resetting actions are initiated by the converter so as to be ready to start the next scan at the appropriate instant. When using certain types of receiving facsimile device, such as a cathode ray tube, this enables a series of comparatively short line scans to be implemented, and each succeeding scan can start as soon as the computer sends a signal to indicate that it has prepared the necessary data in the core buffer area B10.

By means of the various control actions described in this embodiment the system may produce not only black text on a white background or white text on a black background but a number of combinations of a text image with repetitive patterned images or with picture elements. In addition, the data prepared by the computer can cause any of these various effects to appear in selected portions of the image area so as to construct a page containing a wide range of visual images. Further, the images required to produce a page in full colour can also be generated.

Pattern Generator

Figure 11:
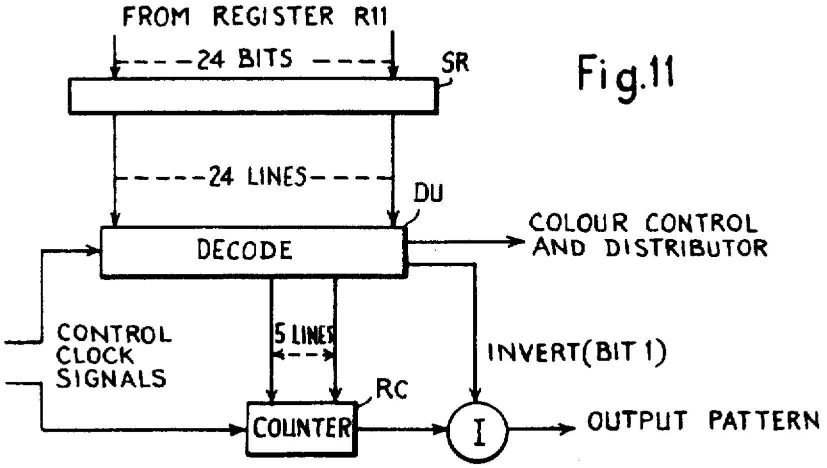
FIGS. 11 and 12 are more detailed diagrams of parts of the system shown in FIGS. 9 and 10, and FIGS. 13 to 16 are illustrations accompanying the description of the computer programme.

The pattern generator P1 is shown in FIG. 11 and consists of a 24 bit storage register SR of bistable circuits, a decode unit DU consisting of normal logic gates etc., and a 5-bit shift register counter RC.

When a control word, decoded from the 24-bit word stream passing through the registers R10, R11, calls for the pattern generator P1 to operate, the parameter word immediately behind the control word in the word stream is routed from the output of the register R11 in the converter to the 24 bit register SR in the pattern generator where it is stored until fresh information is received. The decode unit DU interprets the parameter word data according to word format W2*a* (FIG. 10). Thus the most significant 5 bits in the 24 bit word, after the control information, represent, in run-length coded form, the first black section of the pattern to be reproduced. The 5 bit codes are fed in parallel, in order of significance, to the counter RC where they are counted down to provide a serial output signal.

As each 5 bit word is counted to zero the next 5-bit word is gated in and counted down and this continues cyclically until further information is received. The output signal thus represents a continuously repeated series of black and white runs. The clocking of the counter from the control clock signals is arranged so that the least significant unit in the 5-bit words represents two normal output elements on the facsimile receivers (i.e., the same as channel 2 in the previous embodiment).

The pattern generator for colour working is similar to that shown for monochrome but would have four counters instead of one. Similarly, although the graphic scanner may be capable of 4-colour working, a monochrome original can be used, in which case the output may be sent to any output channel.

Merge Unit

Figure 12:
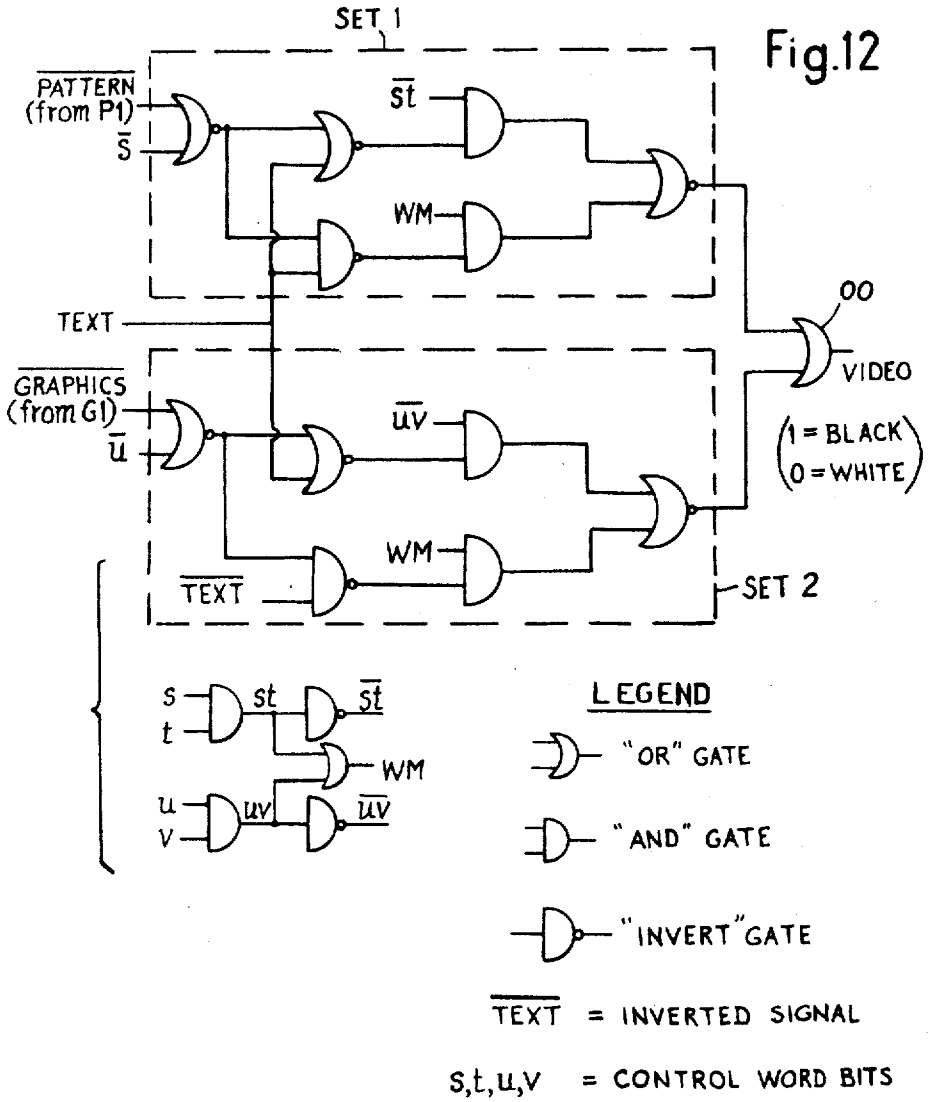

This unit, shown in FIG. 12, consists of two sets of gates namely SET1 and SET2, which are operated by logical combinations of control word bits *s, t, u, v* of word format W1 (FIG. 10). Basically the two identical sets of gates respectively control the merging of text with the output from the pattern generator P1 and the merging of text with the output from the graphic generator G1. The output from the two sections are merged together in the final OR gate 00 to form the video output.

The graphic generator G1 may be a computer controlled flying-spot scanner using a cathode ray tube, or a laser beam and associated optical deflection system, to scan the graphic material and produce a suitable output signal which is fed to the merge unit.

Since all signals indicate black when they are set to "one" and white when they are set to "zero" it will be apparent that an 'OR' gate will produce a black merge of its input signals and an 'AND' gate will produce a white merge.

The four control word bits *s, t, u, v* cause the output video signal to be produced as various combinations of the three input signals labelled TEXT, GRAPHICS and PATTERN.

When *s* is untrue SET1 produces TEXT only; when *s* is true SET1 produces a merge of TEXT and PATTERN which will be a black merge if *t* is also true, but a white merge if *t* is untrue. Similarly, when *u* is untrue SET2 produces TEXT only; when *u* is true SET2 produces a merge of TEXT and GRAPHICS. However, when *u* is true, then SET2 produces a black merge of TEXT and GRAPHICS when *v* is true, but a white merge of inverted TEXT and GRAPHICS when *v* is untrue.

The final OR gate 00 produces a black merge of the signals from SET1 and SET2. An exception to the above description is that a white merge in either SET1 or SET2 will override a black merge in the other set of gates.

It will be apparent from the foregoing that it is possible to obtain the following kinds of output video signal by setting the appropriate control bits *s, t, u, v:*

TEXT only,
black or white merge of TEXT and PATTERN,
black merge of TEXT and GRAPHICS,
white merge of inverted TEXT and GRAPHICS,
black merge of TEXT, PATTERN and GRAPHICS.

A particularly novel video output is produced as a black merge of two composite signals, the first of which consists of a white merge of PATTERN and TEXT, whilst the second consists of a white merge of GRAPHICS and inverted TEXT: this results in patterned text inlayed into graphics. Other combinations of the three input signals are obviously possible by selecting the remaining combinations of control word bits *s, t, u, v*.

For monochrome and for sequential four-colour operation, the merge unit is as described above and only one facsimile receiver is required. In the case of four-colour simultaneous operation, four facsimile receivers are used and the merge unit may consist of four sections, each similar to the unit described above.

The Computer Programme

There will now be described one form of programme that has actually been constructed in order to demonstrate the feasibility of the technique with which the system of the invention is concerned. It is however to be understood that the programme might be extended or varied in many ways.

Since the facsimile receiving device which accepts signals from the computer and records them as black and white areas on photographic film or paper can be constructed so as to scan either large or small sheets of sensitive material, the system may generate pages of almost any desired size. As mentioned previously, in the particular case of a Muirhead 'Pagefax' receiver in its present standard form, the page area can be as much as 24 inches wide by 16 inches deep.

The programme is designed to assemble data defining the content of such pages, or of two or more smaller pages to be set side by side on one film, and to generate signals which, when recorded on film, will give precisely the appearance of newspaper pages containing typography in several styles and a wide range of sizes intermixed with rules, borders, photographs and drawings.

Figure 13:
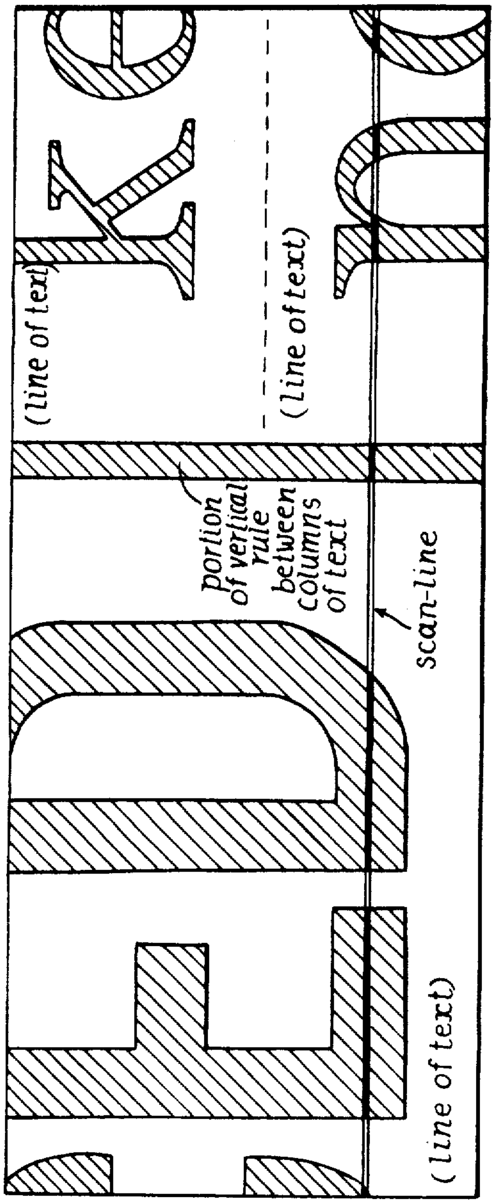

As previously explained the output from the computer has to specify the required page image as a sequence of very narrow linear scans, each band or scan line being contiguous to the next. The data for each band must define in detail the distribution of the black and white portions of the band with sufficient precision that the combined visual effect of the assembled scans will be the shape of typographical characters and other elements of the desired page image. FIG. 13 illustrates in a highly enlarged form a portion of one of the bands across part of a typical page.

Figure 14:
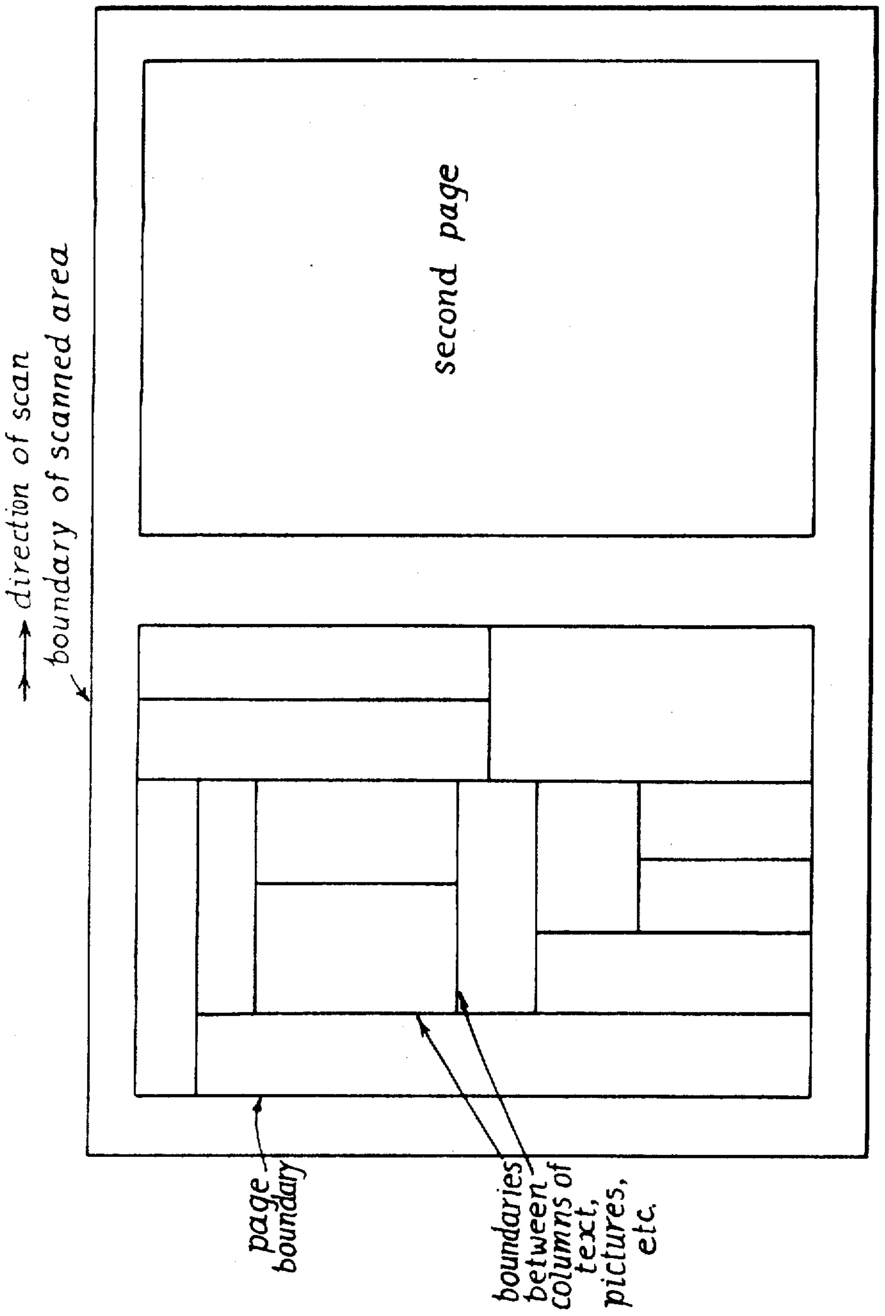

Beginning with a definition of the desired rectangular page-area, the data to be assembled defines the positions and dimensions of a number of smaller areas into which a page is to be divided, typically for the purpose of creating several columns of text. FIG. 14 illustrates one such page layout.

These dimensions, and the data referred to subsequently, are communicated to the computer through keyboard terminals, using a repertoire of command-codes by which particular numbers are assigned particular meanings. For example, a command of the form 3–50W would be interpreted by the computer programme as declaring that the width of a given area was 3.50 inches.

Having defined a page layout in this way the computer is given further data consisting mainly of text characters interspersed with further commands indicating which area of the page is being referred to and what size and style of type is required. For example the command 18P would call for 18-point type to be used for a particular portion of the text.

Figure 15:
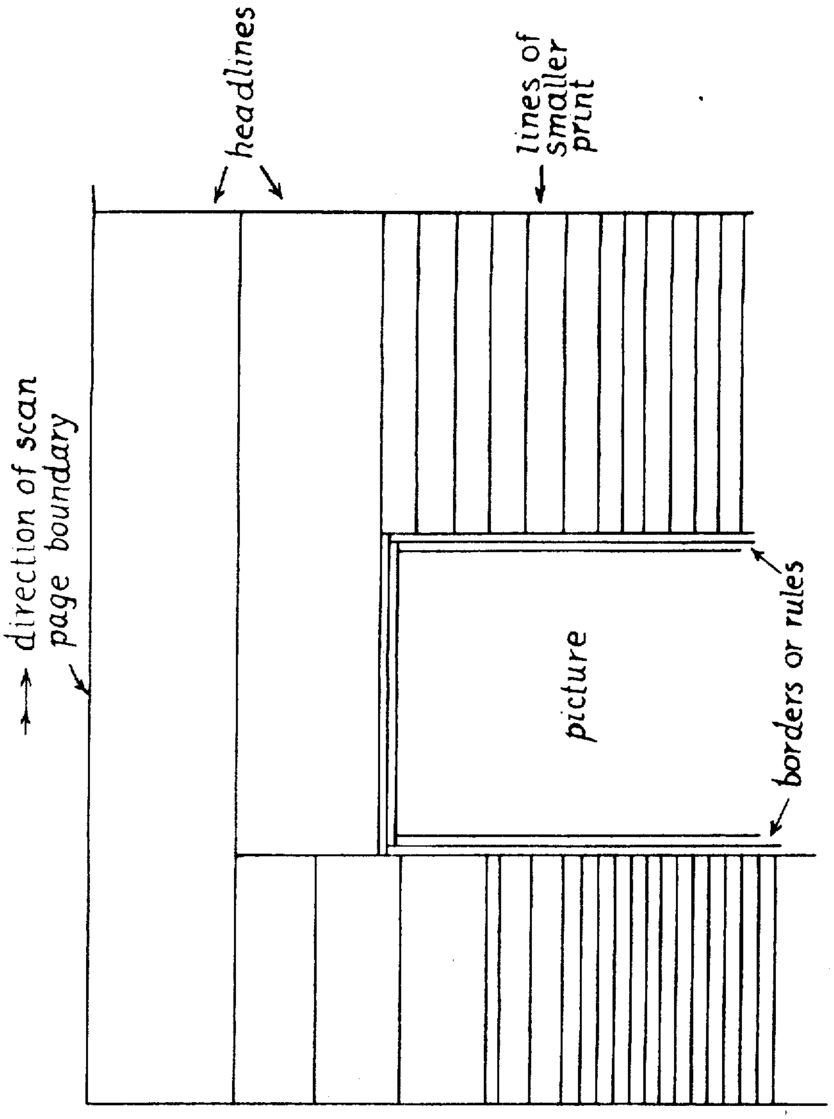

The programme uses the data referred to above to sub-divide each area into smaller rectangular areas, each sufficient to contain a single line of type of the required size. FIG. 15 indicates a portion of a page divided in this way into these smaller rectangular areas.

At a later stage, the programme further sub-divides each rectangle into many smaller rectangles, each of a width appropriate to the actual typographic character which is to appear at that position, but this operation is not carried out until the lines of text have been sorted into a new sequence according to their positions in the page. The sorting process produces a sequence of rectangles commencing with the one which is to occupy the top left hand corner of the page, and ending with the one which is to occupy the bottom right hand corner.

FIG. 16 shows how the first few lines of text would be dealt with as a result of the sorting process and their sub-division into rectangles (numbers 1 to 34) for individual characters.

Once the data is in this form, the output section of the programme is able to operate to produce the first band across the top of the page. It then continues, producing further bands one at a time, placing the data in an area of store which operates as a buffer between the programme and the circuits which transmit the data to the facsimile receiver.

Whenever the buffer becomes too full for the programme to continue to generate more output data the programme waits for output to catch up. Similarly, if data for the next scan is not complete at the moment when the facsimile receiver or other device becomes ready to take it, that device is made to wait until a signal is produced by the programme to inform it that another band of data is ready in the buffer.

These arrangements are implemented by circuits attached to the computer which extract data from the buffer store and convert it into signals acceptable to the facsimile receiver. Data in the buffer area is in run-length-coded form, which economises in storage and reduces the quantity of data to be passed from the buffer to the converter circuits. The buffer can also contain certain control information which is acted upon by the converter circuits as part of the process of expanding the data into the final form on which it goes to the facsimile receiver.

At any given moment, the output programme is processing only those lines of text (or blank areas, rules, or pictures) which are intersected by the band or scan-line that is in course of preparation, as in FIG. 13. As the processing proceeds down the page, lines of text that are completed are discarded and replaced by others, the sequence in which they are used being that into which the lines were earlier sorted.

The amount of black and white to be generated in each portion of the band must evidently be derived from:

a. the identity of the character that appears at this position, b. the type style or font in which it is to be set, c. the height and width of the character, together with stored information about the shapes of the various characters in different styles and sizes.

The programme utilizes more than one method to perform this task. On the one hand, data descriptive of successive scans across each character of a particular font may be stored in the computer and accessed as and when needed. At the other extreme, programmes are used which each calculate the data for the next scan across a particular character in a particular font. By either method, or by a combination of the two, the computer can rapidly generate the data required for the next band across the page.

The main subdivisions of the computer programme are the following:

1. KEYBOARD INPUT

Reads to store text characters and commands keyed at any of several terminals, and interprets them to form text-strings, layout strings, and other groupings of data required by later sections of the programme.

2. ASSEMBLER

Responds to a keyboard command by accessing data for a prescribed page or portion of a page and sorting it into the sequence required for output.

3. OUTPUT

Using data produced by ASSEMBLER, generates data defining successive scans across a page or portion of the page, and also sends out control signals to the converter device and receives control signals from it.

4. CHARACTER GENERATOR

A number of sub-programmes used within the OUTPUT programme to calculate the black-white portions of the next scan across any individual character, or to access previously prepared data for the same purpose.

These sections of the programme generally operate in the sequence indicated, but can also be interleaved in their operation so as to respond to several terminals and output devices asynchronously.

It will be understood that the facsimile receivers and cathode ray facsimile devices may be remote from the main computer and converter and be connected thereto by any suitable form of signal channel, which may include either a cable or radio link. Moreover, the system can use a variety of sources for the graphic data including a facsimile transmitter, as previously described. Text from remote locations can also be transmitted in this way if desired.

The size of page that can be produced is governed only by the dimensions of the facsimile receiver drum, provided of course that its speed of rotation is chosen so as to allow the computer sufficient time to assemble the data for successive scans.

Where the system is operated so as only to reproduce an image on a cathode ray device, it can operate at a higher speed than when reproducing an image on a facsimile receiver, since the latter involves a mechanical scanning arrangement.

Since the systems described produce an output consisting of successive scans across an image, this output could, for example, be recorded on a storage device and then be "played back" at T.V. speed to produce a video picture of the image in question. Essentially the same computer programmes and converter equipment would then compose type and other images for video transmission or closed circuit T.V. displays.

The facsimile receiver or receivers may include a hesitation or pause facility, which operates if a blockage or break occurs in the information fed to a receiver. When the fault is cleared the receiver can continue to receive information at the point where it left off.

It will be noted that in the system according to the present invention, for the purpose of increasing the resolution in the scanning line direction, the number of elements per inch along the line is made to be appreciably greater than the number of scan lines per inch. In this way images of adequate quality can be obtained with a moderate number of scan lines per inch. Thus, in the specific embodiments described, the scan line density is 400 lines per inch and the horizontal definition is 1,600 elements per inch.

As the signals are transmitted in the form of run-length coding, this improved result can be obtained without appreciable increase in the amount of data to be generated and reproduced, since no additional transitions from black to white and vice versa are introduced, and the rise and fall times necessary to provide the requisite sharpness of image remain unchanged.

More specifically, although the number of trains of black pulses is unaffected, their durations and their points of incidence and termination along a scan are capable of being more accurately controlled to a degree depending upon the chosen increase in the horizontal definition with respect to the number of scan lines, each per unit distance.

This arrangement particularly provides a greatly improved reproduction of those sloping and curved portions of typescript characters which are inclined with respect to the scan line direction.

A print-out of the program used in the Ferranti Argus 500 computer may be found in the patented file record.

We claim:

1. In a system for generating an optical image from computer derived signals comprising a computer for generating said computer-derived signals according to input data representative of desired features of said optical image, and a facsimile device including an image-reporducing surface and a scanning means for generating said optical image by a time series of linear scans at a constant rate across said surface so as to form an overall raster of scan lines on said surface in response to real-time signals instantaneously representative of the corresponding instantaneous value of the then-occurring one of the linear scans, wherein one scan across the complete width of the raster is completed before another scan is begun, the improvement comprising:

A. means for receiving from said computer said computer-derived signals containing all of the information required to produce an output image as derived by processing the data fed to the computer, said required information being in coded facsimile form, and B. an interconnecting means for interconnecting the receiving means and the facsimile device to cause the linear scans to occur in response to said computer-derived signals comprises:

1. means for asynchronously receiving said computer-derived signals in the form of sequential run-length encoded blocks of data respectively representing the desired values along the length of each of said linear scans, and 2. converter means including storage means for storing the asynchronously received computer-derived signals as received in run-length encoded facsimile form and counter means for converting the thus stored signals as needed to generate synchronously said real-time facsimile signals fed to said scanning means of said facsimile device, the converter means having a first channel including a first plurality of registers and means interconnecting said registers to form a first push-down stored each of one computer word length, and having a second channel including a second plurality of registers forming a second push down store, the converter means further comprising a merge unit connected to the counter device and to a final register in the second push-down store and connected to the facsimile device for selectively merging a color and white patterns to the facsimile device.

2. A system as claimed in claim 1, in which the computer-derived signals are in the form of run-length encoded counts divided into at least two parts, at least one part representing a colour count, where said colour may be black, and at least another part representing a white count and in which the converter means includes a plurality of registers and means interconnecting said registers to form a push-down store each of one computer word length, and including means for feeding the output from the push-down store to a counter device, and means for operating said counter device so that the signal transmitted to the facsimile receiver is maintained colour and white for the appropriate durations as determined by the run-length encoded counts.

3. A system as claimed in claim 2, in which the computer includes a buffer store the improvement further comprising a first storage area and a second storage area in the buffer store each said area being sufficiently large to hold the run-length encoded counts for one complete line scan of the facsimile device, and signaling means connected to said converter means and to said storage areas for controlling the converter means to extract signals from one of said areas to create one line scan, for simultaneously controlling computer filling of the other of said areas with sufficient run-length encoded counts to cover the next line scan.

4. A system as claimed in claim 2, in which the computer includes a buffer store, and the improvement further comprising cyclic means in the buffer store wherein the run-length encoded counts for each line scan terminate in a distinctive word and logic means connected to the cyclic means for sensing the distinctive words to prevent overlapping of successive line scans.

5. A system as claimed in claim 1, in which the converter means includes a control word store in combination with a clock connected to the store and to the scanning means for giving precise correspondence between a control word and a specific position on any one scan.

6. A system as claimed in claim 1, in which the input data represents features of a multi-coloured image and including a plurality of said facsimile devices and means for feeding the output of said converter means to said respective facsimile devices each of which produces an image according to one of the colour components of the colour image to be reproduced.

7. A system as claimed in claim 1, including a merging unit means connected to the facsimile device for feeding additional information to said facsimile device for reproduction by said linear scans.

8. A system as claimed in claim 7, wherein said merging unit is connected to the facsimile device and to the computer for merging graphic information with text information under the control of control signals from said computer.

9. A system according to claim 1 further comprising:

A. a second scanning means connected to the facsimile device for scanning a pattern in synchronism with the first said scanning means of the facsimile device, the second scanning means concurrently producing output signals representative of said pattern.

10. In a system for the composition of typescript or other material comprising a computer for generating electronic signals representative of said typescript or other material and for storing said signals as data within the computer, data handling means for feeding data representative of said typescript or other material to said computer, a facsimile device operated by the output signals from the computer and including an image reproducing surface in said facsimile device, and means for reproducing the typescript or other material by a series of linear scans across said surface to form an image, each line scan passing through a portion of each element of typescript or other material to be reproduced during that line and said series of linear scans forming an overall raster of scan lines on said image-reproducing surface, wherein one scan across the complete width of the raster is completed before another scan is begun, the improvement comprising:

A. means for receiving from said computer said output signals containing all of the information required to produce an output image as derived by processing the data fed to the computer, said required information being in coded facsimile form, and B. converter means connected between said receiving means and said facsimile device to convert the computer output signals in coded facsimile form to a form suitable for reproduction by the facsimile device including push-down storage means connected directly to the receiving means for compensating for the varying time durations of the operations performed by said computer and for the varying time durations of the conversion process and counter means connected directly to the push-down storage means for converting the coded facsimile output signals, whereby real-time facsimile output signals representative of the typescript or other material are fed from said converter means at an even rate to said facsimile device for reproduction by said facsimile device, the converter means having a first channel including a first plurality of registers and means interconecting said registers to form a first push-down store each of one computer word length, and having a second channel including a second plurality of registers forming a second push down store, the converter means further comprising a merge unit connected to the counter device and to a final register in the second push-down store and connected to the facsimile device for selectively merging a color and white patterns from the counter and from the second push-down store and feeding the merged patterns to the facsimile device.

11. A system according to claim 10 further comprising:

A. a second scanning means connected to the facsimile device for scanning a pattern in synchronism with the first said scanning means of the facsimile device, the second scanning means concurrently producing output signals representative of said pattern.

12. A system as claimed in claim 10, including means for generating output signals from the computer in the form of run-length coding, and in which the computer words employed for the composition of the material consist of run-length counts divided into at least two parts, at least one part being a colour count, where the colour may be black, and at least another part being a white count and in which the converter includes a plurality of registers and means interconnecting said registers to form a push-down store each of one computer word length, and including means for feeding the output from the push-down store to a counter device, and means for operating said counter device so that the signal transmitted to the facsimile receiver is maintained colour and white for the appropriate durations as determined by the run-length counts.

13. A system as claimed in claim 12, in which the computer includes a buffer store, the improvement further comprising a first storage area and a second storage area in the buffer store each said area being sufficiently large to hold the run-length encoded counts for one complete line scan of the facsimile device, and means controlling said storage areas such that whilst the converter means is extracting signals from one of said areas to create one line scan, the computer is filling the other of said areas with sufficient run-length encoded counts to cover the next line scan.

14. A system as claimed in claim 12, in which the computer includes a buffer store, and wherein the invention further comprises cylic means in the buffer store whereby the run-length encoded counts for each line scan terminate in a distinctive word and logic means connected to the cylic means for sensing the distinctive words to prevent overlapping of successive line scans.

15. A system as claimed in claim 10, in which the converter means includes a control word store in combination with a clock connected to the store and to the scanning means for giving precise correspondence between a control word and a specific position on any one scan.

16. A system as claimed in claim 10, in which the input data represents features of a multi-coloured image and including a distributor device and a plurality of said facsimile devices and means for feeding the output of said converter means through said distributor device to said respective facsimile devices each of which produces an image according to one of the colour components of the colour image to be reproduced.

17. A system as claimed in claim 10, including a merging unit means connected to the facsimile device for feeding of which additional information to said facsimile device for reproduction by said linear scans.

18. A system as claimed in claim 17, wherein said merging unit is connected to the facsimile device and to the computer for merging graphic information with text information under the control of control signals from said computer.

19. A system for generating an optical image from computer-derived signals having A. a computer for generating said computer-derived signals according to input data, in which the computer-derived signals are in the form of run-length encoded counts divided into at least two parts, at least one part representing a color count, where said color may be black, and at least another part representing a white count, A1. a buffer store in the computer, B. means for providing said input data representative of desired features of said optical image to said computer, and C. a facsimile device including an image-reproducing surface and a scanning means for generating said optical image by a time series of linear scans at a constant rate across said surface in response to real-time signals instantaneously representative of the corresponding instantaneous value of the then-occurring one of said linear scans, the improvement comprising:

D. intermediate means interconnecting said computer and said facsimile device to cause the linear scans to occur in response to said computer-derived signals, said intermediate means comprising:

E. means for asynchronously receiving said computer-derived signals including signals in the form of sequential run-length encoded blocks of data respectively representing the desired values along portion of length of each of said linear scans, and F. converter means for storing the asynchronously received computer-derived signals as received and for cnverting the thus stored signals as needed to generate synchronously said real-time signals fed to said scanning means of said facsimile device, the converter means having a first channel including a first plurality of registers and means interconnecting said registers to form a first push-down store each of one computer word length, and having a second channel including a second plurality of registers forming a second push down store, the converter further having a G. a counter device, the converter means further including means for feeding the output from the first push-down store to said counter device, and H. means for operating said counter device so that the signal transmitted to the facsimile received is maintained color and white for the appropriate durations as determined by the run-length encoded counts, I. the converter means further comprising a merge unit connected to the counter device and to a final register in the second push-down store and connected to the facsimile device for selectively merging a color and white patterns from the counter and from the second push-down store and feeding the merged patterns to the facsimile device, J. a first storage area and a second storage area in the buffer store, each said area being sufficiently large to hold the run-length encoded counts for one complete line scan of the facsimile device, and K. means for controlling said storage areas such that, while the converter means is extracting signals from one of said areas to create one line scan, the computer is filling the other of said areas with sufficient run-length encoded counts to cover the next line scan, L. said facsimile device being in the form of at least one rotating drum facsimile receiver, including means to support a photo-sensitive carrier on said drum and means for scanning in a linear fashion to produce scans similar duration across said carrier by a light spot modulated with the output signals from the converter means.

20. A system as claimed in claim 19, in which the input data represents features of a multi-colored image, the system including a plurality of said facsimile devices and means for feeding the output of said converter means to the respective facsimile devices, each of which produces an image according to one of the color components of the color image to be reproduced.

* * * * *